(12) United States Patent
Rotem et al.

(10) Patent No.: US 11,647,047 B2
(45) Date of Patent: May 9, 2023

(54) INTERCEPTING REPORTS OF HARMFUL E-MAILS THAT ARE REPORTED TO AN AUTHORITY

(71) Applicant: Avanan Inc., Great Neck, NY (US)

(72) Inventors: Roy Rotem, Tel Aviv (IL); Gil Friedrich, Great Neck, NY (US)

(73) Assignee: AVANAN INC., Great Neck, NY (US)

( * ) Notice: Subject to any disclaimer, the term of this patent is extended or adjusted under 35 U.S.C. 154(b) by 270 days.

(21) Appl. No.: 17/142,671

(22) Filed: Jan. 6, 2021

(65) Prior Publication Data

US 2021/0211464 A1    Jul. 8, 2021

Related U.S. Application Data

(60) Provisional application No. 62/957,898, filed on Jan. 7, 2020.

(51) Int. Cl.
*H04L 9/40* (2022.01)
*H04L 51/046* (2022.01)
*H04L 51/42* (2022.01)
*H04L 51/212* (2022.01)

(52) U.S. Cl.
CPC ........ *H04L 63/1483* (2013.01); *H04L 51/046* (2013.01); *H04L 51/212* (2022.05); *H04L 51/42* (2022.05); *H04L 63/145* (2013.01); *H04L 63/1416* (2013.01); *H04L 63/20* (2013.01)

(58) Field of Classification Search
CPC ............. H04L 63/1483; H04L 63/1416; H04L 63/145; H04L 51/42; H04L 51/046
See application file for complete search history.

(56) References Cited

U.S. PATENT DOCUMENTS

| | | |
|---|---|---|
| 10,187,407 B1 * | 1/2019 | Higbee ............... H04L 63/1433 |
| 2018/0255010 A1 * | 9/2018 | Goyal .................... H04L 51/212 |
| 2021/0133670 A1 * | 5/2021 | Cella ...................... G06N 3/044 |
| 2021/0182996 A1 * | 6/2021 | Cella ...................... G06N 3/047 |
| 2021/0192412 A1 * | 6/2021 | Krishnaswamy .......................... G06Q 10/06393 |
| 2022/0187847 A1 * | 6/2022 | Celia ...................... G06Q 10/08 |

* cited by examiner

*Primary Examiner* — Matthew Smithers
*Assistant Examiner* — Shu Chun Gao
(74) *Attorney, Agent, or Firm* — Mark M. Friedman

(57) ABSTRACT

A data security system, including a security manager computer making network application programming interface (API) calls to a cloud-based service that (i) performs data exchange transactions for end users, and (ii) includes a mechanism for an end user to invoke in order to report a transaction received by the end user to a central authority as being a potentially harmful or deceptive transaction, the API calls remotely controlling the cloud-based service so that the security manager computer accesses transactions that have entered the cloud-based service, and a data inspector operative to analyze a transaction as being harmful or deceptive, by applying machine learning, wherein the security manager computer controls the cloud-based service so as to transmit transactions reported by the mechanism to the security manager, instead of or in addition to the central authority, for analysis by the data inspector.

18 Claims, 3 Drawing Sheets

INTERCEPTING REPORTS OF HARMFUL E-MAILS THAT ARE REPORTED TO AN AUTHORITY

FIELD OF THE INVENTION

The present invention relates to data security for e-mail services.

BACKGROUND OF THE INVENTION

A major threat to users and companies is harmful and deceptive e-mails. Proprietary data is compromised and computers are harmed when an unsuspecting user opens an e-mail or an e-mail attachment or opens a link that contains a computer virus, a phishing scheme or other malware.

Many companies rely on local or cloud-based e-mail services such as Microsoft OFFICE 365® and Google GMAIL and are now training their employees to recognize potentially harmful or deceptive e-mails. Microsoft Office 365 enables a user to add a button to OUTLOOK® that reports potentially harmful or deceptive e-mails to Microsoft. Reference is made to FIG. 1, which is a prior art image of a ribbon at the top of Microsoft Outlook, with a button 10 for reporting an e-mail as being potentially a phishing e-mail. When a user pushes button 10, the reported e-mail is automatically forwarded to phish@office365.microsoft.com.

Third party e-mail security vendors would like to have access to suspect e-mails submitted by users, in order to train their security inspection engines, and in order to take responsive actions such as blocking future e-mails from the same sender or from the same sender IP address or from the sender's Internet service provider (ISP). However, unless such a third party provides its own e-mail server and client, it must provide a custom Outlook add-on which needs to be installed by its entire end user base.

It would thus be of advantage to have a way for third party e-mail security vendors to access e-mails reported by users of Microsoft Office 365, Google Gmail and other e-mail services, as potentially harmful or deceptive, without the need for the users to install custom add-ons.

SUMMARY

Embodiments of the present invention provide systems and methods for third party e-mail security vendors to access e-mails reported by users of Microsoft Office 365, Google Gmail and other e-mail services, as potentially harmful or deceptive, without the need for the users to install custom add-ons.

Such systems and methods have widespread advantage, including training end users to be aware of potential harmful or deceptive e-mail, such as phishing e-mail or other malware, training security systems that apply machine learning to automatically identify harmful and deceptive e-mail, and discovering security breaches within an organization.

There is thus provided in accordance with an embodiment of the present invention a data security system, including a security manager computer making network application programming interface (API) calls to a cloud-based service that (i) performs data exchange transactions for end users, and (ii) includes a mechanism for an end user to invoke in order to report a transaction received by the end user to a central authority as being a potentially harmful or deceptive transaction, the API calls remotely controlling the cloud-based service so that the security manager computer accesses transactions that have entered the cloud-based service, and a data inspector operative to analyze a transaction as being harmful or deceptive, by applying machine learning, wherein the security manager computer controls the cloud-based service so as to transmit transactions reported by the mechanism to the security manager, instead of or in addition to the central authority, for analysis by the data inspector.

There is additionally provided in accordance with an embodiment of the present invention a method for data security, including making network application programming interface (API) calls, by a security processor, to a cloud-based service that performs data exchange transactions for end users and includes a mechanism for an end user to invoke in order to report a transaction received by the end user to a central authority as being a potentially harmful or deceptive transaction, controlling the cloud-based service, via the API calls, so as to transmit a transaction reported by the mechanism to the security processor instead of or in addition to the central authority, and applying machine learning to the transaction reported by the mechanism, to determine if the transaction is harmful or deceptive.

There is additionally provided in accordance with an embodiment of the present invention a data security system, including a security manager computer making network application programming interface (API) calls to a cloud-based service that (i) performs data exchange transactions for end users, and (ii) includes a mechanism for an end user to invoke in order to report a transaction received by the end user to a central authority as being a potentially harmful or deceptive transaction, the API calls remotely controlling the cloud-based service so that the security manager computer accesses transactions that have entered the cloud-based service, and a data inspector operative to analyze a transaction as being harmful or deceptive, by applying machine learning, wherein the security manager computer controls the cloud-based service so as (i) to intercept a message that is automatically generated and sent to the cloud-based service, in response to user invocation of the mechanism, and (ii) to identify the potentially harmful or deceptive transaction based at least on information in the intercepted message.

BRIEF DESCRIPTION OF THE DRAWINGS

The present invention will be more fully understood and appreciated from the following detailed description, taken in conjunction with the drawings in which.

For reference to the figures, the following index of elements and their numerals is provided. Similarly numbered elements represent elements of the same type, but they need not be identical elements.

| Table of elements in the figures | |
|---|---|
| Element | Description |
| 10 | button for reporting harmful e-mail |
| 100 | end users |
| 110 | end user computing devices |
| 120 | e-mail client |
| 150 | e-mail reported to be harmful |
| 200 | cloud computing center |
| 220 | cloud-based e-mail service |
| 300 | cloud security platform |
| 310 | security manager |
| 320 | data inspector |
| 400 | central reporting authority |

Elements numbered in the 1000's are operations of flow charts.

DETAILED DESCRIPTION

In accordance with embodiments of the present invention, systems and methods are provided for intercepting e-mails reported to a central authority as being harmful and/or deceptive.

Figure 1:
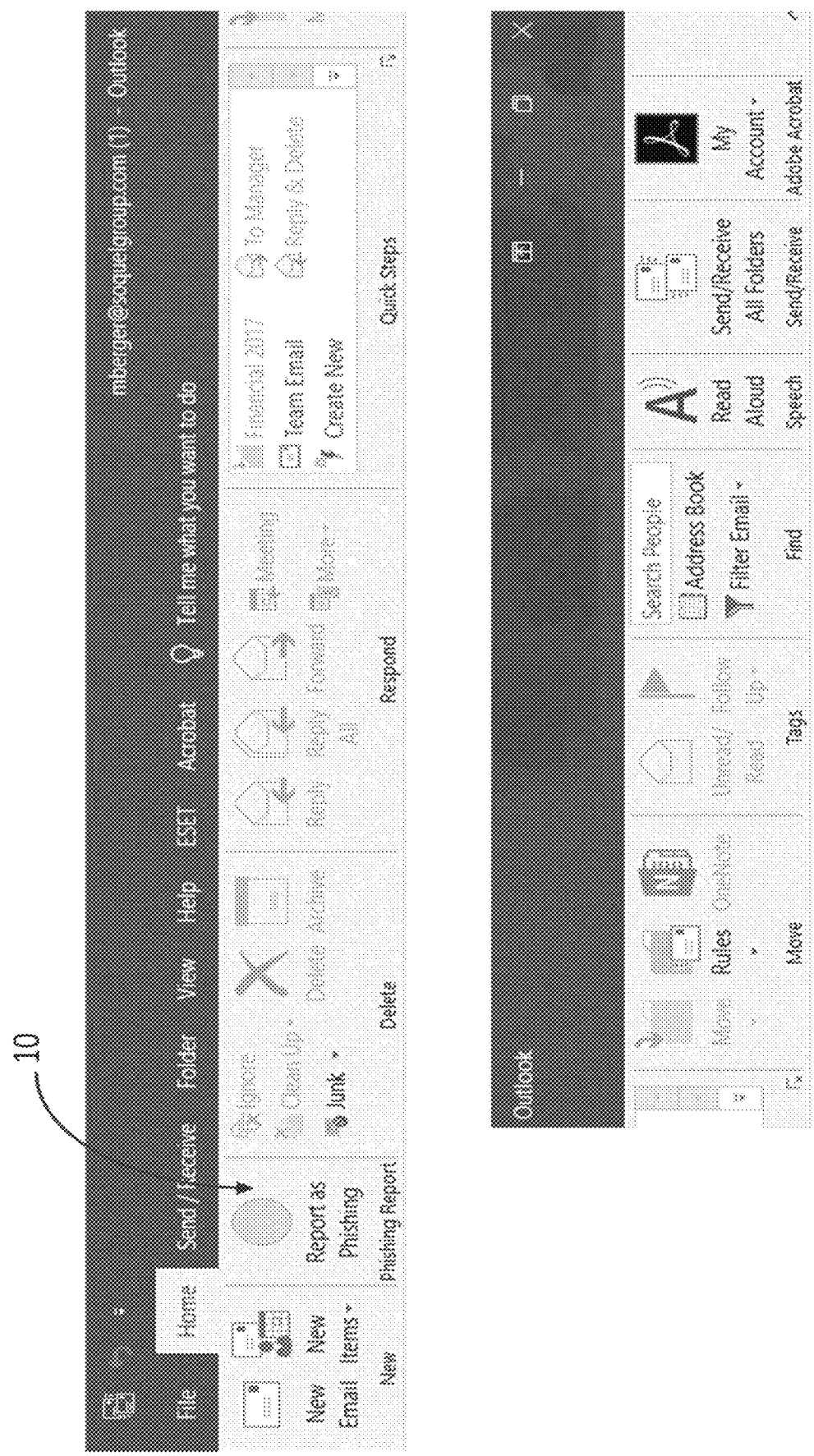
FIG. 1 is a prior art image of a ribbon at the top of Microsoft Outlook with a button for reporting an e-mail as being potentially a phishing e-mail.
Figure 2:
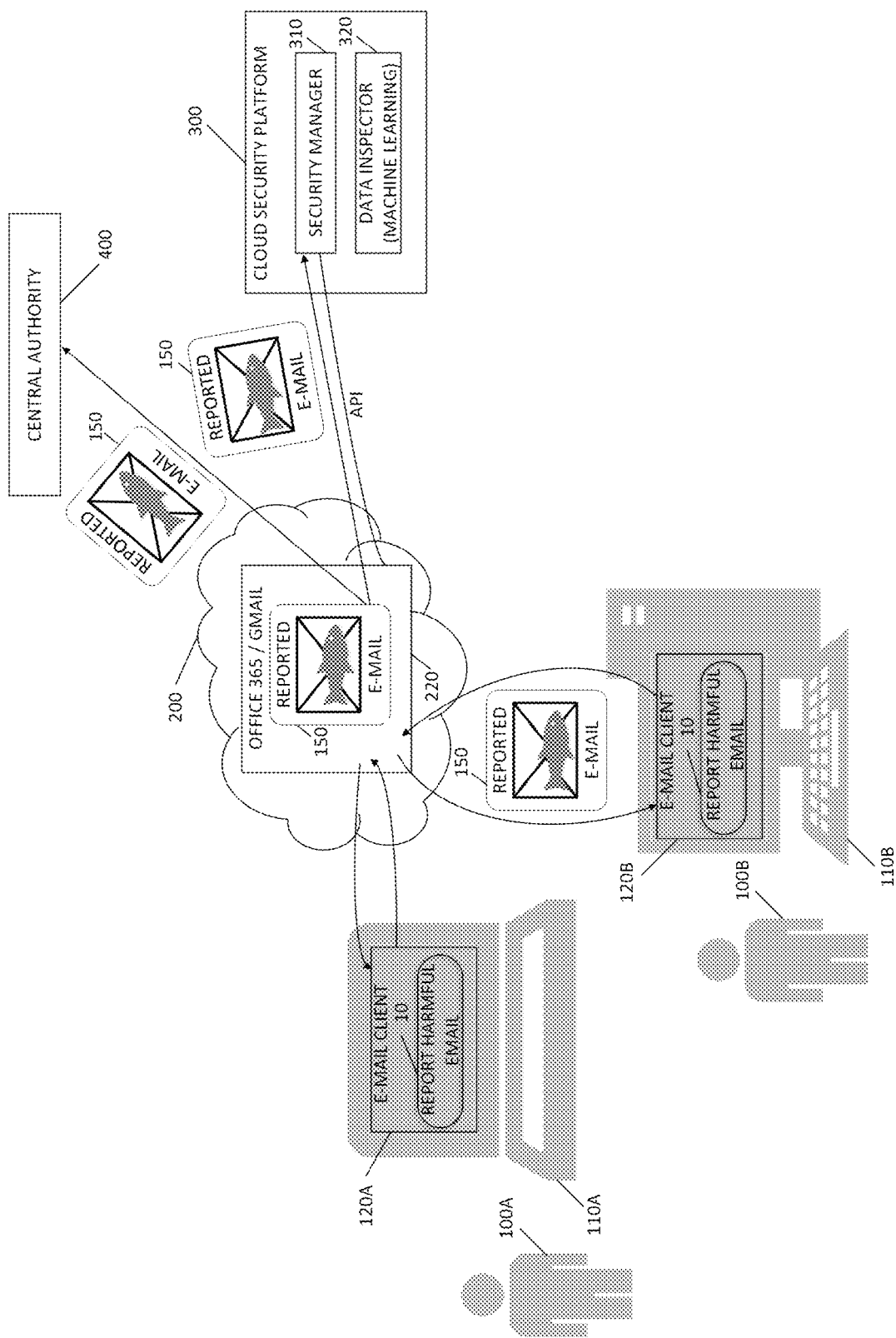
FIG. 2 is a simplified block diagram of a data security system that intercepts e-mails reported as being harmful or deceptive, in accordance with an embodiment of the present invention.

Reference is made to FIG. 2, which is a simplified block diagram of a data security system that intercepts e-mails reported as being harmful or deceptive, in accordance with an embodiment of the present invention. Shown in FIG. 2 are end users 100A and 100B who access cloud-based e-mail service 220, such as OFFICE 365® developed by Microsoft Corporation of Redmond, Wash., USA, and GMAIL® developed by Google Inc. of Mountain View, Calif., USA, that run in a cloud computing center 200. Although FIG. 2 shows e-mail service 220 as being OFFICE 365/GMAIL, it will be appreciated by those skilled in the art that embodiments of the present invention apply to other e-mail services as well. End users 100A and 100B access service 220 using any of a variety of respective computing devices 110A and 110B, including inter alia a laptop computer, a desktop computer, and a smartphone. Each computing device 110A and 110B incudes a respective local e-mail client 120A and 120B installed thereon, for sending and receiving e-mails via service 220. For purposes of data security, each e-mail client 120A and 120B includes button 10, for end user 100A and 100B to report a received e-mail as being potentially harmful and/or deceptive. FIG. 2 shows user 100B reporting an e-mail 150 as being potentially harmful and/or deceptive; e.g., a phishing e-mail.

Also shown in FIG. 2 is a cloud security platform 300, including a security manager 310 and a data inspector 320. Security manager 300 remotely accesses e-mail service 220 using the service's application programming interfaces (API). Security platform 300 may itself be a cloud-based system. Security manger 310 and data inspector 320 may or may not reside on the same computer or even within the same cloud. Data inspector 320 may be, for example, its own cloud service.

As described in U.S. Pat. No. 10,372,931, the contents of which are hereby incorporated in their entirety by reference, security manager 310 and data inspector 320 protect end user computing devices 110A and 110B from incoming e-mails that are harmful and/or deceptive. In addition, security manager 310 and data inspector 320 include programmable data processing, storage and communication circuitry for performing the operations described below with reference to the flowchart of FIG. 3.

Data inspector 320 may use a variety of methods to inspect suspicious e-mails as being harmful and/or deceptive. Harmful and/or deceptive e-mails include inter alia phishing e-mails, and e-mails with malware links and/or attachments. In one embodiment of the present invention, data inspector 320 applies machine learning. Using training sets of e-mails, data inspector 320 learns to identify phishing e-mails and e-mails with malware links and/or attachments, and optionally spam and junk e-mails. Data inspector 320 quarantines harmful and/or deceptive e-mails, and blocks them from reaching end user computers 110A and 110B.

When user 100B reports a suspicious e-mail 150 using button 10, the e-mail is generally forwarded to a central authority 400, such as phish@office365.microsoft.com. However, in accordance with an embodiment of the present invention, security manager 310 controls e-mail service 320 so that e-mail service 320 forwards reported e-mail 150 to security manager 310 instead of or in addition to central authority 400. Security manager 310 then provides reported e-mail 150 to data inspector 320, which analyzes reported e-mail 150 to determine if it is harmful and/or deceptive.

In an alternative embodiment of the present invention, cloud security manager 310 uses API calls to intercept an auto-message that reports a suspicious email, which is automatically generated and sent from client 110A or 110B to e-mail service 220, in response to user 100A or 100B pressing reporting button 10 in e-mail clients 120A or 120B, respectively. Security manager 310 identifies the suspicious e-mail inter alia from information in the intercepted auto-message.

If data inspector 320 determines that reported e-mail 150 is harmful and/or deceptive, then one or more responsive actions are taken. One responsive action is to block further e-mails originating from the same sender, or from the sender's IP address, or from the sender's Internet service provider (ISP).

Another responsive action is to re-train data inspector 320 using reported e-mail 150 as part of a training set. Indeed, if reported e-mail 150 is harmful and/or deceptive, then security manager 310 should have blocked it from reaching computing device 110B in the first place. The fact that reported e-mail 150 reached computing device 110B indicates a flaw in data inspector 320. Re-training data inspector 320 is a way to correct this flaw.

It will be appreciated by those skilled in the art that there are widespread advantages, beyond tuning/re-training of data inspector 320, for cloud security platform 300 to know when user 100A or 100B presses reporting button 10 in e-mail clients 120A or 120B, respectively. In particular, the suspicious e-mail may be a training message, and cloud security platform 300 may determine which user detected the suspicious e-mail. Furthermore, cloud platform 300 may detect an attack on an organization based on the suspicious emails that are reported. As such, the ability to know when user 100A or 100B presses button 10 in e-mail clients 120A or 120B, respectively, may be of paramount importance to the organization.

Figure 3:
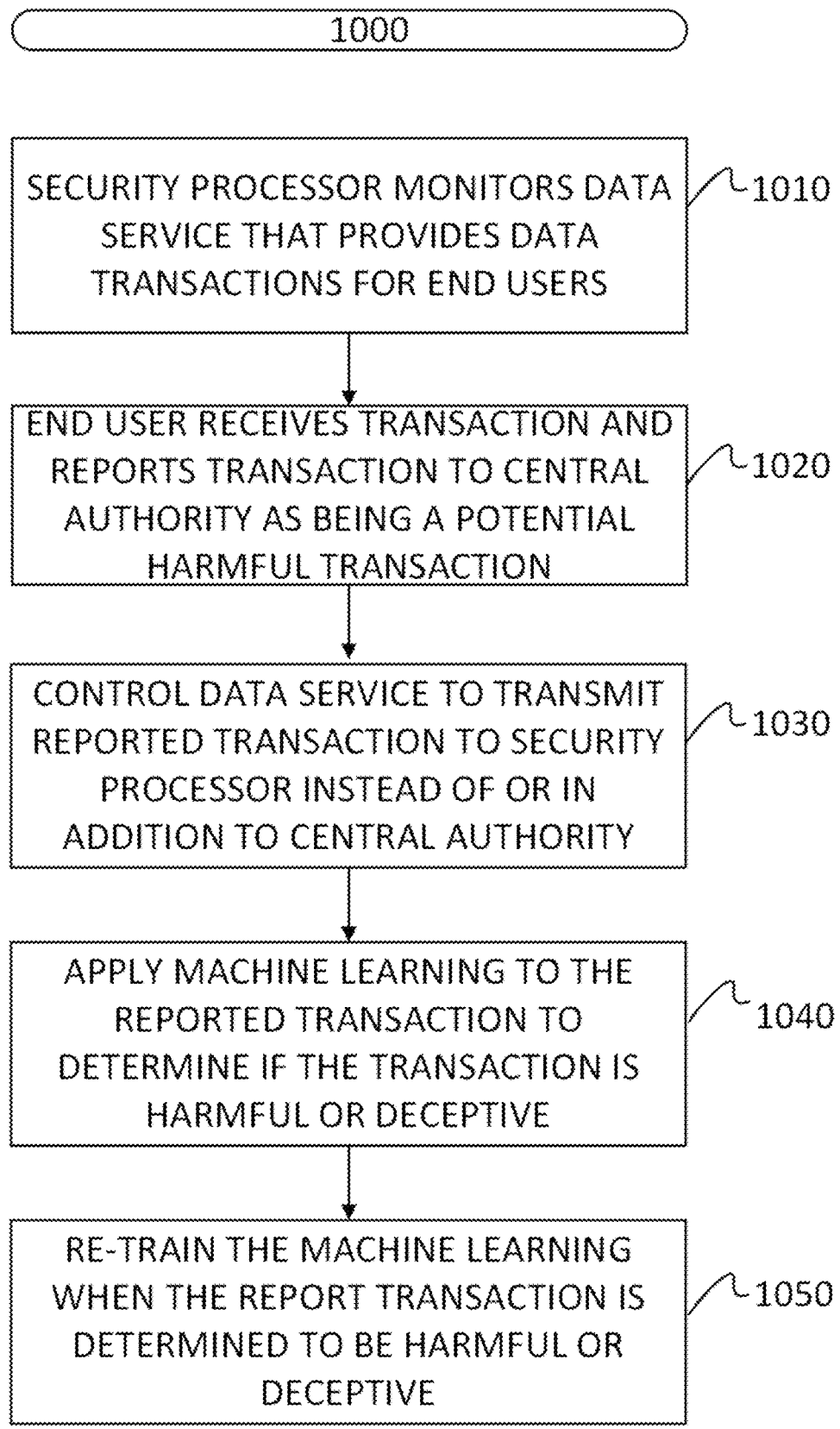
FIG. 3 is a simplified flowchart of a method for data security that intercepts e-mails reported as being harmful or deceptive, in accordance with an embodiment of the present invention.

Reference is made to FIG. 3, which is a simplified flowchart of a method 1000 for data security that intercepts e-mails reported as being harmful or deceptive, in accordance with an embodiment of the present invention. Method 1000 is practiced by security manager 310 and data inspector 320, to provide security for e-mail service 220.

At operation 1010 security manager 310 monitors e-mail service 220. At operation 1020 end user 110A or 110B receives an e-mail that appears to be harmful, and clicks on button 10 to forward the e-mail to central authority 400. At operation 1030 security manager 310 controls service 220 to transmit the reported e-mail 150 to security manager 310 instead of or in addition to central authority 400. Security manager 310 controls service 220 using a network application programming interface (API), which causes service 220 to identify e-mails being forwarded to central authority 400 and to forward them to security manager 310 instead of or in addition to central authority 400. At operation 1040 data inspector 320 analyzes reported e-mail 150 to determine if it is harmful and/or deceptive. If data inspector 320 determines that reported e-mail 150 is harmful or deceptive, then at operation 1050 security manager 310 causes a remedial action to be performed. The remedial action may include re-training data inspector 320 using reported e-mail 150 as part of its training set. The remedial action may include blocking future e-mails from the sender of reported e-mail 150, or from the senders IP address, or from the sender's ISP.

It will be appreciated by those skilled in the art that there are alternative embodiments of the present invention. In one alternative embodiment, end users 100A and 100B use a web-based e-mail client provided by and located at cloud security platform 300, instead of local e-mail clients, and button 10 is part of the web-based e-mail client. In another alternative embodiment, button 10 is not present, and instead a user reports a potentially harmful and/or deceptive e-mail by forwarding the e-mail to central authority 400 using a conventional forwarding mechanism.

It will further be appreciated by those skilled in the art that the present invention has widespread application to other cloud-based services that provide data exchange transactions.

Embodiments of the present invention provide many advantages vis-à-vis conventional enterprise security systems. Because these embodiments are network-API-based, then do not rely on a proxy and are not inline. They are immediately deployable and do not require changes to an enterprise network configuration, nor to end user e-mail clients. They do not require installation of an add-on for a reporting mechanism to end user e-mail clients, but rather make use of existing reporting mechanisms.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. A data security system, comprising:
 a security manager computer making network application programming interface (API) calls to a cloud-based service that (i) performs data exchange transactions for end users, and (ii) includes a mechanism for an end user to invoke in order to report a transaction received by the end user to a central authority as being a potentially harmful or deceptive transaction, the API calls remotely controlling the cloud-based service so that the security manager computer accesses transactions that have entered the cloud-based service; and
 a data inspector operative to analyze a transaction as being harmful or deceptive, by applying machine learning,
 wherein said security manager computer controls the cloud-based service so as to transmit transactions reported by the mechanism to said security manager computer, instead of or in addition to the central authority, for analysis by said data inspector, and
 wherein said security manager computer controls the cloud-based service by generating one or more security platform rules that are applied by the cloud-based service and cause the cloud-based service to automatically transmit the transactions reported by the mechanism to the security manager computer instead of or in addition to the central authority.

2. The system of claim 1 wherein the potentially harmful or deceptive transaction is a training transaction, used to train end users how to identify potential security breaches.

3. The system of claim 1 wherein the mechanism comprises a user interface button within an end user or a web-based application that sends and receives data exchange transactions.

4. A method for data security, comprising:
 making network application programming interface (API) calls, by a security processor, to a cloud-based service that performs data exchange transactions for end users and includes a mechanism for an end user to invoke in order to report a transaction received by the end user to a central authority as being a potentially harmful or deceptive transaction;
 controlling the cloud-based service, via the API calls, so as to transmit a transaction reported by the mechanism to the security processor instead of or in addition to the central authority; and
 applying machine learning to the transaction reported by the mechanism, to determine if the transaction is harmful or deceptive, wherein said controlling the cloud-based service comprises generating one or more security platform rules that are applied by the cloud-based service and cause the cloud-based service to automatically transmit the transaction reported by the mechanism to the security processor instead of or in addition to the central authority.

5. The method of claim 4 further comprising re-training the machine learning when said applying determines that the transaction reported by the mechanism is harmful or deceptive.

6. The method of claim 4 further comprising identifying an end user who invoked the mechanism to report a potentially harmful or deceptive transaction.

7. The method of claim 4 further comprising identifying a security breach when said applying determines that the transaction reported by the mechanism is harmful or deceptive.

8. The method of claim 4 further comprising blocking incoming transactions from the sender of the transaction reported by the mechanism, or from the sender's IP address, or from the sender's Internet service provider, when said applying determines that the transaction reported by the mechanism is harmful or deceptive.

9. A data security system, comprising:
 a security manager computer making network application programming interface (API) calls to a cloud-based service that (i) performs data exchange transactions for end users, and (ii) includes a mechanism for an end user to invoke in order to report a transaction received by the end user to a central authority as being a potentially harmful or deceptive transaction, the API calls remotely controlling the cloud-based service so that the security manager computer accesses transactions that have entered the cloud-based service; and a data inspector operative to analyze a transaction as being harmful or deceptive, by applying machine learning, wherein said security manager computer controls the cloud-based service so as (i) to intercept a message that is automatically generated and sent to the cloud-based service, in response to user invocation of the mechanism, and (ii) to identify the potentially harmful or deceptive transaction based at least on information in the intercepted message, and wherein said security manager computer controls the cloud-based service by generating one or more security platform rules that are applied by the cloud-based service and cause the cloud-based service to automatically transmit transactions reported by the mechanism to the security manager computer instead of or in addition to the central authority.

10. The system of claim 9 wherein the potentially harmful or deceptive transaction is a training transaction, used to train end users how to identify potential security breaches.

11. The system of claim 9 wherein the mechanism comprises a user interface button within an end user or a web-based application that sends and receives data exchange transactions.

12. A method for data security, comprising:

making network application programming interface (API) calls, by a security processor, to a cloud-based service that performs data exchange transactions for end users and includes a mechanism for an end user to invoke in order to report a transaction received by the end user to a central authority as being a potentially harmful or deceptive transaction; and controlling the cloud-based service, via the API calls, so as to transmit a transaction reported by the mechanism to the security processor instead of or in addition to the central authority, wherein said controlling the cloud-based service comprises generating one or more security platform rules that are applied by the cloud-based service and cause the cloud-based service to automatically transmit the transaction reported by the mechanism to the security processor instead of or in addition to the central authority.

13. The method of claim 12 further comprising analyzing the transaction reported by the mechanism, to determine if the transaction is harmful or deceptive.

14. The method of claim 13 wherein the analyzing the transaction includes applying machine learning to the transaction.

15. The method of claim 14 further comprising re-training the machine learning when said analyzing determines that the transaction reported by the mechanism is harmful or deceptive.

16. The method of claim 12 further comprising identifying an end user who invoked the mechanism to report a potentially harmful or deceptive transaction.

17. The method of claim 12 further comprising identifying a security breach when said analyzing determines that the transaction reported by the mechanism is harmful or deceptive.

18. The method of claim 12 further comprising blocking incoming transactions from the sender of the transaction reported by the mechanism, or from the sender's IP address, or from the sender's Internet service provider, when said analyzing determines that the transaction reported by the mechanism is harmful or deceptive.

\* \* \* \* \*